US010671298B2

(12) United States Patent
Rayaprolu et al.

(10) Patent No.: US 10,671,298 B2
(45) Date of Patent: Jun. 2, 2020

(54) STORING PAGE WRITE ATTRIBUTES

(71) Applicant: Micron Technology, Inc., Boise, ID (US)

(72) Inventors: Vamsi Pavan Rayaprolu, San Jose, CA (US); Sampath K. Ratnam, Boise, ID (US); Kishore Kumar Muchherla, Fremont, CA (US); Harish R. Singidi, Freemont, CA (US); Ashutosh Malshe, Boise, ID (US); Gianni S. Alsasua, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/913,157

(22) Filed: Mar. 6, 2018

(65) Prior Publication Data
US 2019/0278491 A1    Sep. 12, 2019

(51) Int. Cl.
*G06F 3/06* (2006.01)

(52) U.S. Cl.
CPC ............ *G06F 3/0619* (2013.01); *G06F 3/064* (2013.01); *G06F 3/0634* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,259,506 B1* | 9/2012 | Sommer | ............. | G11C 11/5642 |
| | | | | 365/185.03 |
| 9,583,160 B1* | 2/2017 | Pekny | ....................... | G11C 7/22 |
| 10,026,483 B1* | 7/2018 | Shah | ....................... | G11C 16/16 |
| 10,192,596 B2* | 1/2019 | Pekny | ....................... | G11C 7/12 |
| 2009/0091979 A1* | 4/2009 | Shalvi | ..................... | G11C 11/56 |
| | | | | 365/185.09 |
| 2009/0113112 A1* | 4/2009 | Ye | ....................... | G06F 12/0246 |
| | | | | 711/102 |
| 2009/0313444 A1* | 12/2009 | Nakamura | ............ | G06F 11/008 |
| | | | | 711/159 |
| 2012/0102259 A1* | 4/2012 | Goss | ........................ | G11C 7/04 |
| | | | | 711/103 |
| 2012/0134213 A1* | 5/2012 | Choi | ........................ | G11C 7/04 |
| | | | | 365/185.18 |
| 2012/0254699 A1* | 10/2012 | Ruby | .................... | G06F 11/1048 |
| | | | | 714/773 |
| 2015/0301932 A1* | 10/2015 | Oh | .......................... | G06F 11/00 |
| | | | | 711/102 |
| 2015/0310938 A1* | 10/2015 | Kim | .................. | G11C 29/50004 |
| | | | | 714/721 |

(Continued)

*Primary Examiner* — Kevin Verbrugge
(74) *Attorney, Agent, or Firm* — Lowenstein Sandler LLP

(57) ABSTRACT

Data to store at a storage system is received. The storage system includes data blocks and the plurality of blocks that include a first region corresponding to a first storage density and a second region corresponding to a second storage density that is less dense than the first storage density. The data is stored at the first region of the plurality of data blocks that corresponds to the first storage density. A write attribute related to storing the data at the first region of the plurality of data blocks is determined. Thereupon, the write attribute related to storing the data at the first region is stored in the second region of the plurality of data blocks that corresponds to the second storage density.

20 Claims, 6 Drawing Sheets

(56) References Cited

U.S. PATENT DOCUMENTS

| | | | | |
|---|---|---|---|---|
| 2016/0033976 A1* | 2/2016 | Jung | ................. | G05B 15/02 |
| | | | | 700/299 |
| 2016/0117216 A1* | 4/2016 | Muchherla | .............. | G06F 11/08 |
| | | | | 714/6.11 |
| 2017/0200492 A1* | 7/2017 | Yang | .................. | G11C 11/5642 |
| 2017/0255403 A1* | 9/2017 | Sharon | ................ | G06F 3/0619 |
| 2017/0262198 A1* | 9/2017 | Nakata | ................ | G06F 3/0619 |
| 2017/0271031 A1* | 9/2017 | Sharon | ................ | G11C 29/42 |
| 2017/0345510 A1* | 11/2017 | Achtenberg | ........ | G06F 11/1048 |
| 2018/0046231 A1* | 2/2018 | Raghu | .................. | G06F 1/3225 |
| 2018/0189135 A1* | 7/2018 | Naik | .................. | G06F 11/1068 |
| 2018/0293029 A1* | 10/2018 | Achtenberg | ............ | G11C 7/04 |

\* cited by examiner

US 10,671,298 B2

STORING PAGE WRITE ATTRIBUTES

TECHNICAL FIELD

Embodiments of the disclosure relate generally to storage systems, and more specifically, relate to storing page write attributes.

BACKGROUND

A memory system can be a storage system, such as a solid-state drive (SSD), and can include one or more memory components that store data. For example, a memory system can include memory devices such as non-volatile memory devices and volatile memory devices. The memory system can further include a controller that can manage each of the memory devices and allocate data to be stored at the memory devices. A host system can utilize the memory system and request data from the memory system. The controller can be used to retrieve data from the corresponding memory devices and return the retrieved data to the host system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
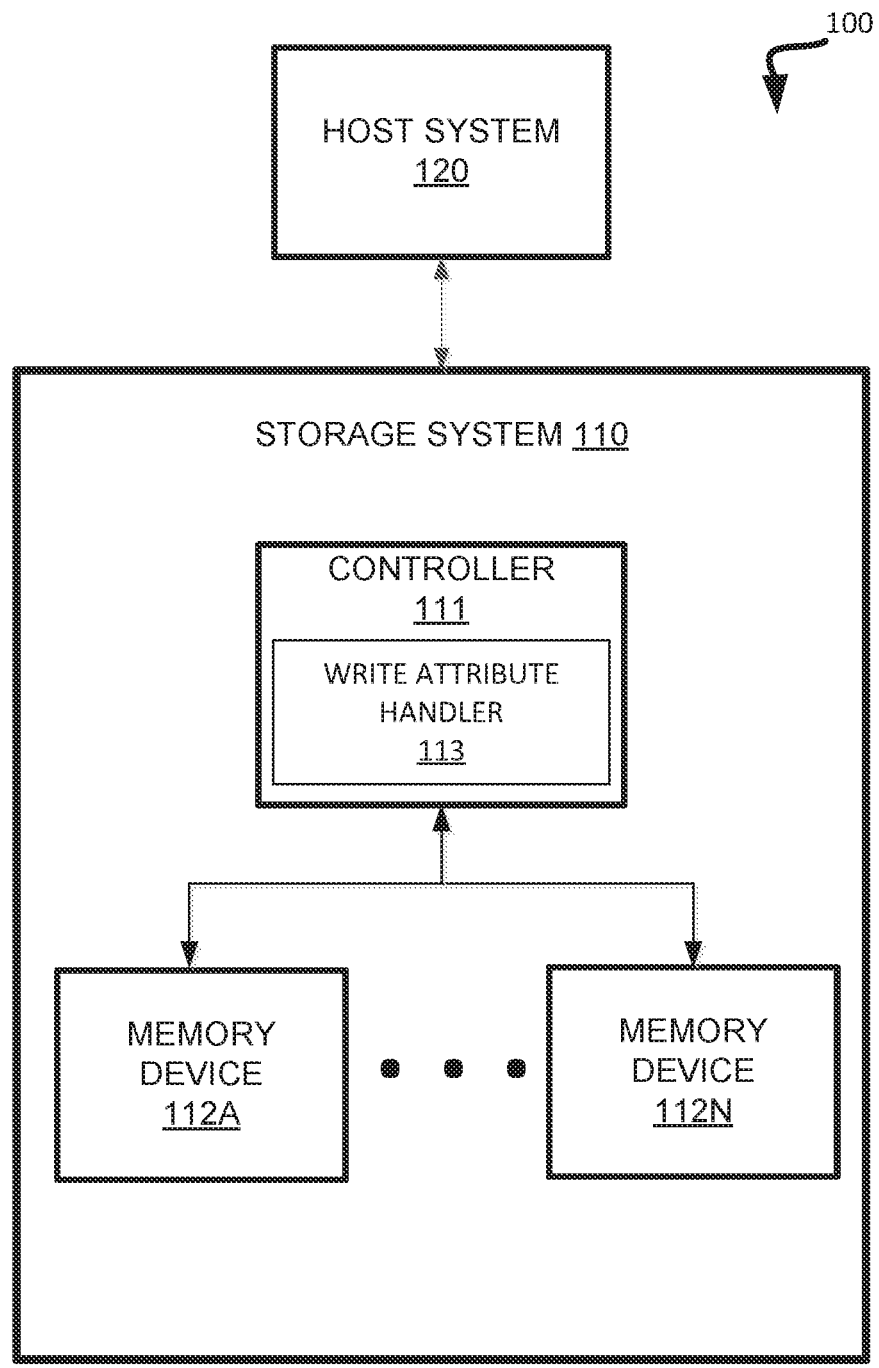
FIG. 1 illustrates an example computing environment that includes a storage system in accordance with some implementations of the present disclosure.

Aspects of the present disclosure are directed to storing page write attributes in a memory system. An example of a memory system is a storage system, such as a solid-state drive (SSD). In some embodiments, the memory system is a hybrid memory/storage system. A storage system is used as an example of a memory system throughout this document. In general, a host system can utilize a storage system that includes one or more memory devices. The memory devices can include non-volatile memory devices, such as, for example, negative- and (NAND). The host system can provide data to be stored at the storage system. The data can be stored at and retrieved from memory devices within the storage system. The memory devices of the storage system can include memory cells that are used to store data from the host system.

Each memory cell of a memory page can store data values as a threshold voltage for that particular memory cell. In one example, the storage system can include a single-level-cell (SLC) memory in which each memory cell can be programmed with a single bit of data by operating in a binary mode. When storing one bit of data in the SLC memory, a range of possible threshold voltages of the memory cell is divided into two ranges. In some implementations, the two ranges can include a first voltage range that corresponds to the logical data value "1" and a second voltage range that corresponds to the logical data value "0."

Some storage systems can include higher density memory also referred to herein as multi-level-cell (MLC) memory that is programmed by storing 2 bits per memory cell, 3 bits per memory cell, or 4 bits per memory cell. An MLC memory is implemented by identifying multiple distinct programmed threshold voltage ranges. Each distinct threshold voltage range corresponds to a predetermined value for the set of data bits encoded in the memory cell. In the case of storing multiple levels of data, the range of possible threshold voltages is divided into the number of levels of data. In some implementations, if four levels of information are stored, there can be four threshold voltage ranges assigned to the logical data values "11", "10", "01", and "00." Storing multiple bits of information in a single memory cell includes mapping sequences of bits to a voltage level of the cell. After determining that a sequence of bits is to be stored into a particular memory cell, the memory cell can be programmed to a voltage level within a threshold voltage range corresponding to the sequence of bits.

The storage systems can be operated in varying temperature extremes, such as between 0 to 70 degrees Celsius (° C.). These temperature changes can be problematic when data is read from the memory cells. In one example, temperature changes between the programming temperature (e.g., the temperature of the storage system at a time when data is written to memory) and a later reading temperature (e.g., the temperature of the storage system at a time when the data is read from the memory) can result in a higher error rate when reading the data from a memory cell. In some examples, the temperature change can cause a shift or widening of the threshold voltage ranges that correspond to the data values of the memory cell. This shift or widening of the threshold voltage ranges can result in an inaccurate read voltage level being applied when performing a read operation for the data.

To address this shift or widening of the threshold voltage ranges, the programming temperature value of the data can be used to determine a more accurate read voltage level that should be applied when performing the read operation for the data based on the programming temperature and the reading temperature. In some storage systems, the programming temperature can be stored in volatile memory. This, however, comes at a large expense in terms of storage requirements for this data when the volatile memory is limited. Alternatively, the programming temperature can be stored in a non-volatile memory. However, if the non-volatile memory includes MLC memory, then the data stored at the MLC memory can be unreliable in extreme cross temperature read conditions (e.g., when the read temperature is different than the programming temperature).

Embodiments of the disclosure address the above and other deficiencies by utilizing a combination of a higher density memory portion (e.g., an MLC memory portion) and a lower density memory portion (e.g., an SLC memory portion) of a non-volatile memory for storing data and write attributes related to the data programmed at the memory cells. In some implementations, during the programming of data at a block of memory, relevant write attributes are stored in the volatile memory space. The data is programmed at the MLC memory portion (e.g., MLC region) of the non-volatile memory. When programming of the data at the block is complete, the write attributes are stored on a data structure (e.g., a table) at the last page of the block. In that regard, other relevant attributes including some storage system properties and/or other environmental and internal storage system conditions can be stored in the data structure at the time data is programmed to the memory cells. The data structure can be, for example, a table or other types of data structures to store the write attributes for each memory page that is programmed. The data structure maintained on the last page can be in an SLC memory portion (e.g., SLC region) of the non-volatile memory that is less dense than the MLC region associated with the data at the programmed memory cells.

An advantage of the disclosure is that both the temperature at which the memory cells are programmed and the current temperature at which the memory cells are read can be accurately determined with minimal overhead as the programming temperature can be stored at a lower density memory region. This is due to the lower read access time and higher reliability of the lower density region of memory when compared with a higher density region. In some implementations, the lower density region can be a SLC memory in which each memory cell is programmed in a binary mode while the higher density region is a MLC memory, such as triple level cells (TLCs) or quad-level cells (QLCs). As a result of saving the write attributes on the SLC page, the write attributes can be more reliably used to compensate for any possible error caused by an extreme shift in temperature from when the data was programmed at a memory cell to when it was subsequently read from the cell.

FIG. 1 illustrates an example computing environment 100 that includes a memory system in accordance with some implementations of the present disclosure. The memory system can include media, such as memory devices 112A to 112N. The memory devices 112A to 112N can be volatile memory devices, non-volatile memory devices, or a combination of such. In some embodiments, the memory system is a storage system (e.g., storage system 110). An example of a storage system 110 is a solid-state drive (SSD). In general, the computing environment 100 can include a host system 120 that uses the storage system 110. In some implementations, the host system 120 can write data to the storage system 110 and read data from the storage system 110. In some embodiments, the memory system is a hybrid memory/storage system.

The host system 120 can be a computing device such as a desktop computer, laptop computer, network server, mobile device, or such computing device that includes a memory and a processing device. The host system 120 can include or be coupled to the storage system 110 so that the host system 120 can read data from or write data to the storage system 110. The host system 120 can be coupled to the storage system 110 via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the storage system 110. The host system 120 can further utilize an NVM Express (NVMe) interface to access the memory devices 112A to 112N when the storage system 110 is coupled with the host system 120 by the PCIe interface. The physical host interface can provide an interface for passing control, address, data, and other signals between the storage system 110 and the host system 120.

As shown in FIG. 1, the storage system 110 can include a controller 111 and memory devices 112A to 112N. The memory devices 112A to 112N can include any combination of the different types of non-volatile memory devices and/or volatile memory devices. An example of non-volatile memory devices includes a negative- and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some implementations, a particular memory device can include both an SLC portion and a MLC portion of memory cells. Each of the memory cells can store bits of data (e.g., data blocks) used by the host system 120. Although non-volatile memory devices such as NAND type flash memory are described, the memory devices 112A to 112N can be based on any other type of memory such as a volatile memory. In some implementations, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative- or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memories, cross point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The controller 111 can communicate with the memory devices 112A to 112N to perform operations such as reading data, writing data, or erasing data at the memory devices 112A to 112N and other such operations. The controller 111 can include hardware such as one or more integrated circuits and/or discrete components, a processing device, a buffer memory, software such as firmware or other instructions, or a combination thereof. In general, the controller 111 can receive commands or operations from the host system 120 and can convert the commands or operations into instructions or appropriate commands to achieve the desired access to the memory devices 112A to 112N. The controller 111 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 111 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The storage system 110 can include a write attribute handler 113 (e.g., circuitry, dedicated logic, programmable logic, firmware, etc.) to perform the operations described herein. In some implementations, the write attribute handler 113 can maintain a data structure on a page in a lower density region (e.g., SLC region) of the memory devices 112A to 112N that stores write attributes related to memory cells programmed in a region with a higher density. The lower density region, in implementations, can be a SLC memory in which each cell is programmed in a binary mode while the higher density region is a MLC memory, such as triple level cells (TLCs) or quad-level cells (QLCs).

In some implementation, the data structure can be a table or other types of data structures to store the write attributes for memory pages in the first region. In some implementations, the table can include a corresponding entry for each memory page associated with data written to the first region. As data from the host system 120 is received to be stored at the memory devices 112A to 112N, the write attribute handler 113 can receive and store an indication of a temperature measurement taken at the time the data is programmed to the memory devices 112A to 112N. After the pages are programmed, the measured temperature is stored on a page in a SLC page in the memory. By storing the write attributes in the SLC page, the controller 111 can determine, for example, whether there is an extreme shift in temperature from when the data was programmed at a memory cell to when it was subsequently read from that memory cell.

The storage system 110 can also include additional circuitry or components that are not illustrated. In some implementations, the storage system 110 can include a cache or buffer (e.g., DRAM) and address circuitry (e.g., a row decoder and a column decoder) that can receive an address from the controller 111 and decode the address to access the memory devices 112A to 112N.

Figure 2:
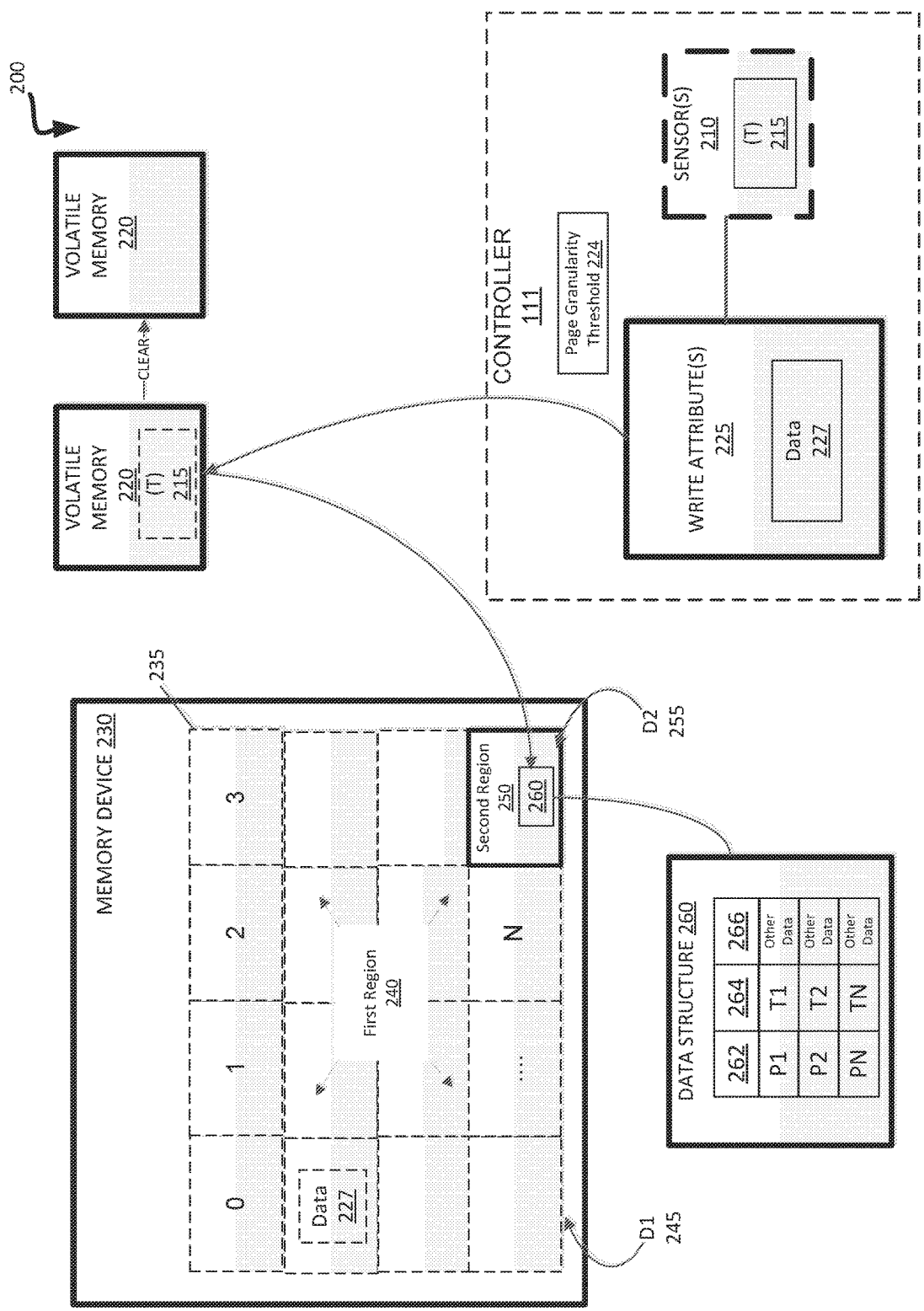
FIG. 2 illustrates a storage system to store page write attributes in accordance with some implementations of the present disclosure.

FIG. 2 illustrates a storage system 200 to store page write attributes in accordance with some implementations of the present disclosure. The storage system 200 corresponds to the storage system 110 of FIG. 1. In some implementations, storage system 200 can include controller 111 of FIG. 1. In some implementations, the controller 111 can be configured to perform memory operations, such as reading and writing data to memory device 230.

As shown, the system 200 can include one or more memory devices, such as memory device 230. The memory device 230 can correspond to the memory device 112A-N of FIG. 1. The memory device 230 can be a non-volatile memory device. The memory device 230 can be organized into one or more blocks 235. The blocks 325 each include multiple pages or memory cells that can correspond to portions of the memory device 230. The size and configuration of the blocks 235 can vary. In some implementations, each of the blocks B0-n can include any number of pages, and each page can have an associated storage capacity for storing data.

The controller 111 receives data 227 to store in the memory device 230. The data 227 can be received, for example, from host system 120 of FIG. 1. This data 227 can be programmed, read, and/or erased from the memory pages of the blocks 235. In some implementations, the memory pages can correspond to a group of memory cells that are read and/or programmed together. The cells are programmed using an iterative programming process. In this type of process, a sequence of programming pulses is applied to a group of memory cells. Such programming can occur in a series of loops where each loop includes only a single program pulse. The values programmed in the cells are read ("verified") after each pulse, and the loop iterations continue until the desired voltage levels are reached. Once the memory cells have been programmed, data is read from the memory cells by translating the programmed voltage level of the memory cells.

In some implementations, the controller 111 stores write attributes 255 associated with programming the data 227 to the memory device 230. The write attributes 225 can include information, for example, related to temperature measurement taken by other sensors 210 at a time in which the data 227 is programmed to the blocks 235 of the memory device 230. The write attributes 255 can also include other relevant attributes including various system property readings and/or other environmental and internal system conditions taken by other sensors 210 at the time the data 227 is programmed to the memory cells. For example, the write attributes 225 can include, but not limited to, state information related to the operating system of system 200, trim information to indicate blocks of data that are no longer considered in use and can be wiped internally, as well as other environmental information, such as a time the data was stored and accelerometer sensor readings that measures any vibrations applied to the system 200 when the data was written. In some implementations, the write attributes 255 are stored for subsequent retrieval during certain operations, such as a read operation during an extreme temperature change.

The write attributes 225 associated with the memory device 230 can be obtained in several ways. In some implementations, the write attributes 225 can include temperature measurements T1 215 received from one or more sensors 210. The sensors 210 measure the temperature T1 215 at a time in which data is to be programmed to the first region 240 of memory device 230. In some implementations, the temperature sensors 210 measure a temperature 215 and to provide an indication of the measured temperature 215 to the controller 111. In other implementations, the temperature sensors 210 can be responsive to one or more commands that can be sent by the controller 111, such as a command to measure temperature 215.

The controller 111 obtains temperature measurements T1 215 from the sensors 210, which can be positioned at various locations on or around the memory device 230 or at other location of system 200. In some implementations, the sensors 210 can be positioned at various locations of system 200, such as on a board and/or affixed to a housing of the system 200. In other implementations, the memory device 230 can also include a temperature sensor 210. In some implementations, the temperature sensors 210 can be located throughout the memory device 230, including temperature sensors 210 located in and around the device itself (e.g., located on a memory die).

During the programming of the blocks 235 of memory device 230, relevant write attributes 225, such as the temperature measurements T1 215, are stored in volatile memory 220 associated with storage system 200. When programming of the blocks 235 is complete, the write attributes 225 are stored on a data structure 260 (e.g., a table) at the last page of the blocks 235. Once the write attributes 225 are stored on the data structure 260, the volatile memory 220 is cleared.

In some implementations, the controller 111 maintains a data structure 260 on a page (e.g., the last page) in a region (e.g., SLC region) of the memory device 230 that is less dense than the region associated with the memory cells programmed with the data 227. In some implementations, the memory device 230 can include a first region 240 of a certain destiny D1 245, such as MLC, TLC or QLC memory, and a second region 250 that has a different destiny D2 255 that is less dense than the first storage density 245, such as a SLC memory in which each memory cell is programmed in a binary mode. An advantage of storing the data structure 260 in the SLC memory region 250 is that the temperature at which the cells in the first region 240 are programmed can be accurately determined with minimal overhead. This is due to the lower read access time and higher reliability of the SLC page stored in the lower density region 250 of memory device 230.

The data structure 260 can be implemented, for example, as a table or other types of data structures to store write attributes 225. In some implementations, the table 260 can include a number of entries with each entry associated with a particular memory page. In some implementations, the table 260 can include a corresponding entry for each memory page associated with data written to the first region 240. Each entry in the table 260 can include fields 262, 264, 266. In some implementations, the table 260 can include a first field 262 that includes an identifier (e.g., an memory address) for a particular memory page, a second field 264 that includes a temperature measurement taken at a time the memory page was programmed, and a third field 266 that includes other relevant write attributes 225 such as various system property readings and/or other environmental and internal storage system readings taken at the program time, as well as other information.

In some implementations, the write attributes 225 are written to the table 260 at different intervals during the programming of the memory device 230. In some implementations, the controller 111 determines whether an amount of pages stored at the first region 240 satisfies a page granularity threshold amount 224. Based on that determination, the write attributes 225 for each of these pages is then stored in the table 260 in the second region 250. This intermediate writing of data allows for the write attributes 225 to be stored in a manner that ensures the table 260 is kept up to date even if the blocks 235 have not been completely programmed.

When a request to read the data 227 from the memory device 230 is received, the controller 111 retrieves the write attribute 225 for the memory page from the table 260 stored on the second region 250. The controller 111 reads the data 227 at the first region 240 of the memory device 230 based on the retrieved write attribute. In some implementations, the controller 111 uses the write attribute 225 to determine if there is an extreme shift in temperature from when the data was programmed at the memory device 230 to when it was subsequently read by the controller 111.

Figure 3:
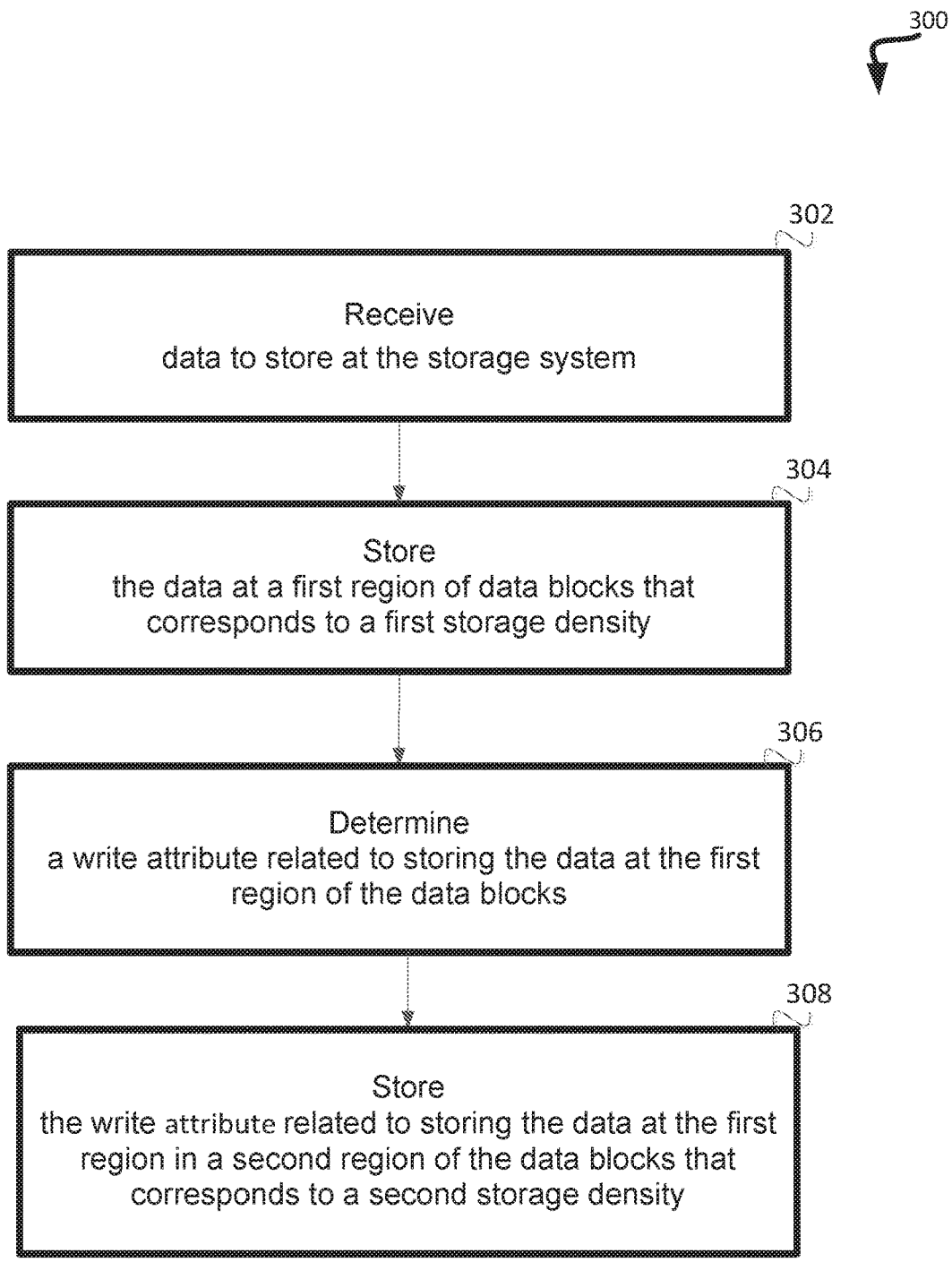
FIG. 3 is a flow diagram of an example method to store page write attributes in accordance with some implementations of the present disclosure.

FIG. 3 is a flow diagram of an example method 300 to store page write attributes in accordance with some implementations of the present disclosure. Method 300 can be performed by processing logic that can include hardware (e.g., circuitry, dedicated logic, programmable logic, microcode, etc.), software (such as instructions run on a processing device), firmware, or a combination thereof. In one embodiment, the write attribute handler 113 of a processing device (e.g., controller 111) in FIG. 1 can perform method 300. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various embodiments. Thus, not all processes are required in every implementation. Other process flows are possible.

At block 302, the processing device receives data to store at the storage system. In some implementations, the processing device can receive the data to store in the data blocks. The data can be received, for example, from a host system. The storage system includes a first region of the data blocks correspond to a first storage density and a second region of the data blocks correspond to a second storage density. The second storage density is less dense than the first storage density. In some implementations, the data blocks can be implemented in a memory device comprising a first region of a certain destiny, such as MLC, TLC or QLC memory, and a second region that has a different destiny that is less dense than the first storage density, such as a SLC memory in which each cell is programmed in a binary mode.

At block 304, the processing device stores the data at the first region of the data blocks that corresponds to the first storage density. To store data, the storage data blocks can include memory cells. Storing data in a single cell typically includes mapping sequences of bits to a voltage level of the cell. In some implementations, the cell can be programmed to a voltage level corresponding to the sequence of bits.

At block 306, the processing device determines a write attribute related to storing the data at the second region of the data blocks. In some implementations, the write attributes associated with the memory device can be determined in several ways. In some implementations, the write attributes can include temperature measurements received from one or more sensors. The sensors can be configured to measure the temperature at a time in which data is to be programmed to the first region of memory device. In some implementations, the temperature sensors can be configured to measure a temperature and to provide an indication of the measured temperature to the controller. In other implementations, the temperature sensors can be responsive to one or more commands that can be sent by the controller, such as a command to measure temperature. In other implementations, these write attributes can include other relevant attributes including various system property readings and/or other environmental and internal system conditions taken by other sensors at the time data is programmed to the memory device.

At block 308, the processing device stores the write attribute related to storing the data in the first region in the second region of the data blocks that corresponds to the second storage density. In some implementations, during the programming of the blocks of memory device, relevant write attributes, such as the temperature measures, are stored in volatile memory associated with system. When programming of the blocks is complete, the write attributes are stored on a data structure (e.g., a table) at a page (e.g., the last page) of the second region (e.g., the SLC region) of the blocks. In some implementations, the processing device maintains a data structure on the last page is in a region (e.g., SLC region) of the memory device that is less dense than the region associated with the programmed memory cells.

Figure 4:
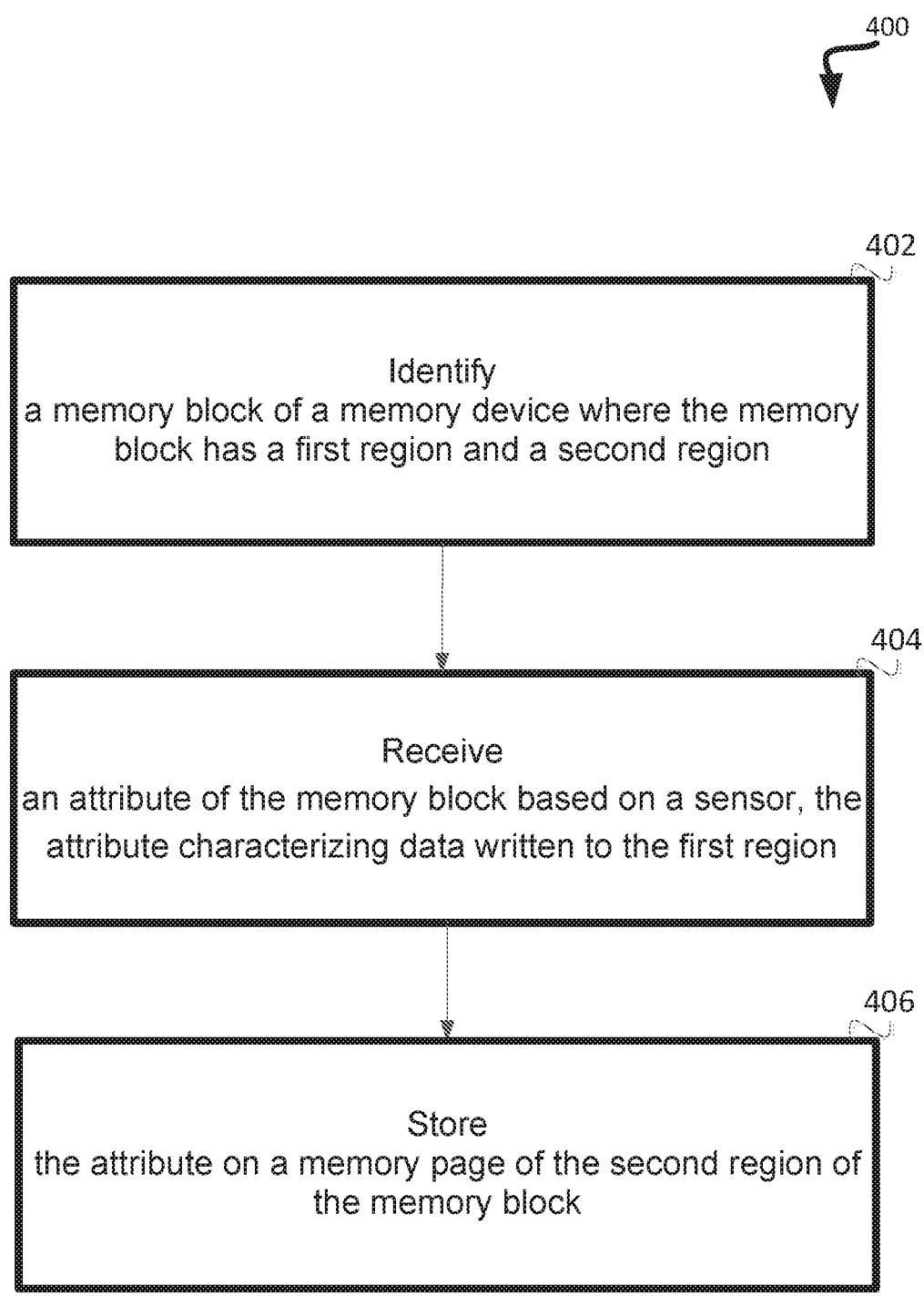
FIG. 4 is a flow diagram of an example method to store page write attributes in accordance with some implementations of the present disclosure.

FIG. 4 is a flow diagram of an example method 400 to store page write attributes in accordance with some implementations of the present disclosure. Method 400 can be performed by processing logic that can include hardware (e.g., circuitry, dedicated logic, programmable logic, microcode, etc.), software (such as instructions run on a processing device), firmware, or a combination thereof. In one implementation, the write attribute handler 113 of a processing device (e.g., controller 111) in FIG. 1 can perform method 400. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At block 402, the processing device identifies a memory block of the memory device. The memory block includes a first region and a second region. In this regard, a storage density of the first region is larger than the second region. In some implementations, the memory device can include a first region of a certain destiny, such as MLC, TLC or QLC memory, and a second region that has a different destiny that is less dense than the first storage density, such as a SLC memory.

At block 404, the processing device receives an attribute of the memory block based on a sensor. This attribute characterizes data written to the first region. In some implementations, the write attributes can include data, for example, related to temperature measurement taken at a time in which memory cells of the memory block are programmed. The write attributes can also include other relevant attributes including various system property readings and/or other environmental and internal system conditions taken at the time data is programmed to the memory cells.

At block 406, the processing device stores the attribute on a memory page of the second region of the memory block. In some implementations, when programming of the blocks is complete, the write attributes are stored on a data structure (e.g., a table) at the last page of the second region (e.g., the SLC region) of the blocks. In some implementations, the processing device maintains a data structure on the last page is in a region (e.g., SLC region) of the memory device that is less dense than the region associated with the programmed memory cells.

Figure 5:
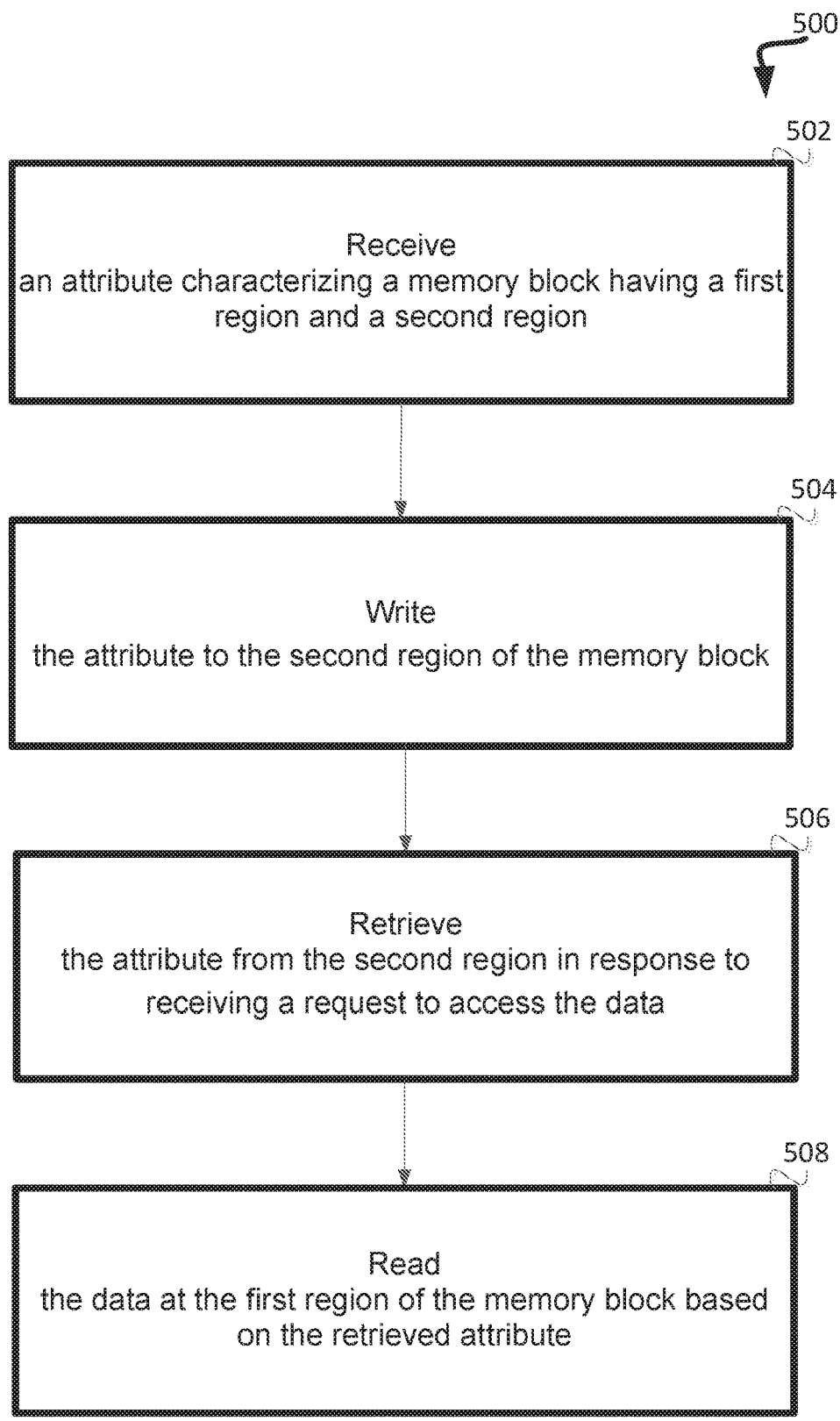
FIG. 5 is a flow diagram of an example method to store page write attributes in accordance with some implementations of the present disclosure.

FIG. 5 is a flow diagram of an example method 500 to store page write attributes in accordance with some implementations of the present disclosure. Method 500 can be performed by processing logic that can include hardware (e.g., circuitry, dedicated logic, programmable logic, microcode, etc.), software (such as instructions run on a processing device), firmware, or a combination thereof. In one implementation, the write attribute handler 113 of a processing device (e.g., controller 111) in FIG. 1 can perform method 500. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At block 502, the processing device receives an attribute characterizing a memory block having a first region and a second region. The attribute includes information related to writing data to the first region. In this regard, a storage density of the first region is larger than the second region. In some implementations, the memory block can include a first region of a certain destiny, such as MLC, TLC or QLC memory, and a second region that has a different destiny that is less dense than the first storage density, such as a SLC memory in which each cell is programmed in a binary mode.

A block 504, the processing device writes the attribute to the second region of the memory block. In some implementations, when programming of the blocks is complete, the write attributes are stored on a data structure (e.g., a table) at the last page of the second region (e.g., the SLC region) of the blocks. In some implementations, the processing device maintains a data structure on the last page is in an SLC region.

At block 506, the processing device retrieves the attribute from the second region in response to receiving a request to access the data. In some implementations, when a request to read data from the memory blocks is received, the processing device can retrieve the write attribute for the data from the table stored on the second region.

At block 508, the processing device reads the data at the first region of the memory block based on the retrieved attribute. In some implementations, the processing device reads the data at the first region of the memory device based on the retrieved write attribute In some implementations, the processing device can use the write attribute to determine if there is an extreme shift in temperature from when the data was programmed at the memory device to when it was subsequently read by the controller. The processing device can then use the information to compensate for any possible error caused by the extreme shift in temperature. In some implementations, threshold voltage ranges that correspond to different sequences of bits can be shifted or changed based on the temperature.

Figure 6:
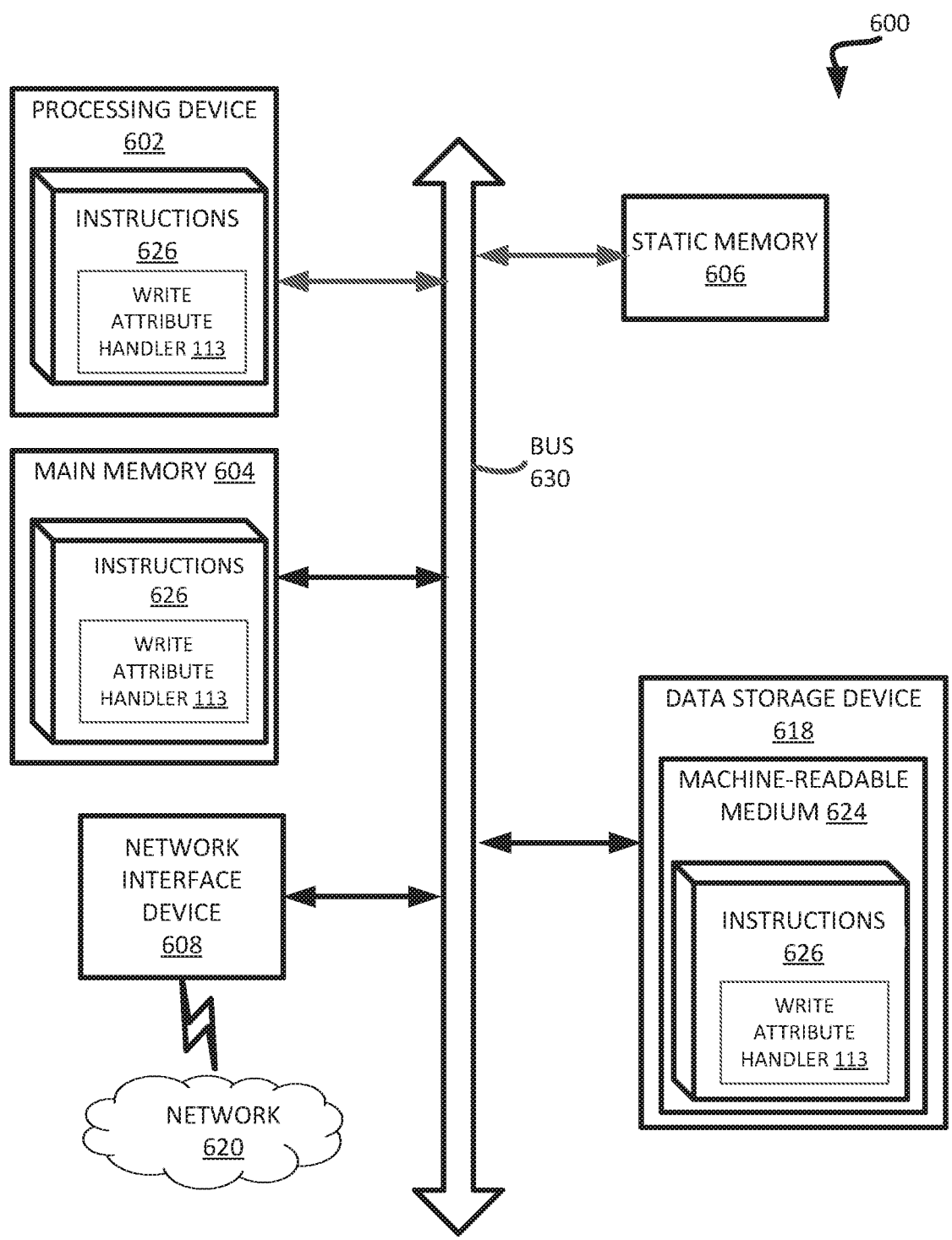
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some implementations, the computer system 600 can correspond to a host system (e.g., the host system 120 of FIG. 1) that includes or utilizes a storage system (e.g., the storage system 110 of FIG. 1) or can be used to perform the operations of a controller (e.g., to execute an operating system to perform operations corresponding to the write attribute handler 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630. Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions or software 626 embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the storage system 110 of FIG. 1.

In one implementation, the instructions 626 include instructions to implement functionality corresponding to a write parameter handler (e.g., the write attribute handler 113 of FIG. 1). While the machine-readable storage medium 624 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a processing device, data to store at a storage system, wherein the storage system comprises a plurality of data blocks and the plurality of data blocks comprises a first region corresponding to a first storage density and a second region corresponding to a second storage density that is less dense than the first storage density;
storing, by the processing device, the data at the first region of the plurality of data blocks that corresponds to the first storage density;
determining, by the processing device, a write attribute related to the storing of the data at the first region of the plurality of data blocks;
during the storing of the data at the first region, storing the write attribute to a volatile memory of the storage system;
determining that the storing of the data at the first region is complete; and
storing, by the processing device, the write attribute in the second region of the plurality of data blocks at the second storage density responsive to the storing of the data at the first region being complete.

2. The method of claim 1, further comprising:
retrieving the write attribute from the second region; and
reading the data at the first region of the plurality of data blocks based on the retrieved write attribute.

3. The method of claim 1, further comprising:
reading a temperature value from a sensor associated with the storage system at a time that the data is written to the first region; and
storing the temperature value at the second region of the plurality of data blocks.

4. The method of claim 1, wherein the first region of the plurality of data blocks is associated with a multi-level cell (MLC), and the second region of the plurality of data blocks is associated with a single level cell (SLC).

5. The method of claim 1, further comprising:
determining whether an amount of pages stored at the first region satisfies a threshold amount; and
storing temperature values for each of the pages in the second region based on the determination.

6. The method of claim 1, further comprising:
identifying one or more system properties related to accessing the data, wherein the system properties are available at a time the data is written to the first region; and
storing the one or more system properties at the second region of the plurality of data blocks.

7. The method of claim 1, further comprising:
identifying a data structure in the second region, the data structure comprising a plurality of entries for a memory page of the data in the first region of the plurality of data blocks, wherein a first entry identifies a memory address associated with the memory page, wherein a second entry identifies a temperature measurement associated with the memory page, and wherein a third entry identifies a system property associated with the memory page.

8. A system comprising:
a volatile memory device;
a non-volatile memory device; and
a processing device, operatively coupled with the volatile memory device and the non-volatile memory device, to:
identify a memory block of the non-volatile memory device, the memory block having a first region and a second region, wherein a storage density of the first region is larger than the second region;
program data at the first region of the memory block;
during programming of the data at the memory block, receive an attribute of the memory block based on a sensor, the attribute characterizing the data being programmed at the first region;
during programming of the data at the memory block, store the attribute at the volatile memory device;
determine that the programming of the data at the first region is complete; and
store the attribute on a memory page of the second region of the memory block responsive to the programming of the data at the first region being complete.

9. The system of claim 8, wherein the processing device is further to:
read a temperature value from the sensor at a time that the data is written to the first region; and
store the temperature value at the second region of the memory block.

10. The system of claim 8, wherein the processing device is further to:
identify one or more system properties related to accessing the data, wherein the system properties are available at a time the data is written to the first region; and
store the one or more system properties at the second region of the memory block.

11. The system of claim 8, wherein the first region is associated with a multi-level cell (MLC) and the second region is associated with a single level cell (SLC).

12. The system of claim 8, wherein the processing device is further to:
determine whether an amount of pages of the memory block stored at the first region satisfies a threshold amount; and
store temperature values for each of the pages in the second region based on the determination.

13. The system of claim 8, wherein the processing device is further to:
identify a data structure in the second region, the data structure comprising a plurality of entries for a memory page of the data in the first region, wherein a first entry identifies a memory address associated with the memory page, wherein a second entry identifies a temperature measurement associated with the memory page, and wherein a third entry identifies a system property associated with the memory page.

14. A non-transitory computer readable storage medium storing instructions, which when executed, cause a processing device to:
receive data to store at a storage system, wherein the storage system comprises a plurality of data blocks and the plurality of data blocks comprises a first region corresponding to a first storage density and a second region corresponding to a second storage density that is less dense than the first storage density;
store the data at the first region of the plurality of data blocks that corresponds to the first storage density;
during storing of the data at the first region, determine a write attribute related to the storing of the data at the first region of the plurality of data blocks;
during the storing of the data at the first region, store the write attribute to a volatile memory of the storage system;
determine that the storing of the data at the first region is complete; and
store the write attribute in the second region of the plurality of data blocks at the second storage density responsive to the storing of the data at the first region being complete.

15. The non-transitory computer readable storage medium of claim 14, wherein the write attribute is based on a sensor communicatively coupled to the processing device.

16. The non-transitory computer readable storage medium of claim 15, wherein the processing device is further to:
read a temperature value from the sensor at a time that the data is written to the first region; and
store the temperature value at the second region.

17. The non-transitory computer readable storage medium of claim 14, wherein the first region is associated with a multi-level cell (MLC) and the second region is associated with a single level cell (SLC).

18. The non-transitory computer readable storage medium of claim 14, wherein the processing device is further to:
determine whether an amount of pages stored at the first region satisfies a threshold amount; and store a temperature value in the second region for each of the pages based on the determination.

19. The non-transitory computer readable storage medium of claim 14, wherein the processing device is further to:
identify one or more system properties related to accessing the data, wherein the system properties are available at a time the data is written to the first region; and
store the one or more system properties in the second region.

20. The non-transitory computer readable storage medium of claim 14, wherein the processing device is further to:
identify a data structure in the second region, the data structure comprising a plurality of entries for a memory page of the data in the first region of the plurality of data blocks, wherein a first entry identifies a memory address associated with the memory page, wherein a second entry identifies a temperature measurement associated with the memory page, and wherein a third entry identifies a system property associated with the memory page.

* * * * *